United States Patent
Vanamurthy et al.

(10) Patent No.: US 10,454,726 B2
(45) Date of Patent: Oct. 22, 2019

(54) SYSTEM FOR INCREASING BANDWIDTH AVAILABLE FOR DATA COMMUNICATION

(71) Applicant: Watchy Technology Private Limited, Bangalore (IN)

(72) Inventors: Sriramkumar Hariharan Vanamurthy, Chennai (IN); Vinoth Kumar Vivekananda, Bangalore (IN)

(73) Assignee: Watchy Technology Private Limited (IN)

( * ) Notice: Subject to any disclaimer, the term of this patent is extended or adjusted under 35 U.S.C. 154(b) by 134 days.

(21) Appl. No.: 15/744,062

(22) PCT Filed: Dec. 23, 2015

(86) PCT No.: PCT/IB2015/059909
§ 371 (c)(1),
(2) Date: Jan. 12, 2018

(87) PCT Pub. No.: WO2016/108150
PCT Pub. Date: Jul. 7, 2016

(65) Prior Publication Data
US 2018/0212803 A1    Jul. 26, 2018

(30) Foreign Application Priority Data
Dec. 29, 2014   (IN) ............................ 6673/CHE/2014

(51) Int. Cl.
*H04L 25/14* (2006.01)
*H04L 12/707* (2013.01)
*H04L 29/06* (2006.01)
*H04L 29/08* (2006.01)
*H04W 76/15* (2018.01)
(Continued)

(52) U.S. Cl.
CPC .............. *H04L 25/14* (2013.01); *H04L 45/24* (2013.01); *H04L 45/245* (2013.01); *H04L 67/28* (2013.01); *H04L 69/14* (2013.01); *H04W 28/0221* (2013.01); *H04W 28/20* (2013.01); *H04W 76/15* (2018.02); *H04L 69/24* (2013.01)

(58) Field of Classification Search
None
See application file for complete search history.

(56) References Cited

U.S. PATENT DOCUMENTS

2003/0174733 A1 * 9/2003 Kawai .................... H04L 45/00
                                                         370/498
2009/0207772 A1 * 8/2009 Ehara ................... H04B 7/2606
                                                         370/312
(Continued)

*Primary Examiner* — Otis L Thompson, Jr.

(57) ABSTRACT

System for increasing bandwidth available for data communication is provided. The system (100) includes user equipment (102) and an intermediate server (104). The user equipment (102) is configured to allocate data to a plurality of data channels (106) for transmission to the intermediate server (104), wherein each of the data channels (106) is associated with a radio access technology (108). The user equipment (102) sends the allocated data via the plurality of data channels (106) simultaneously to a destination server via the intermediate server (104). The user equipment (102) is also configured to receive data from the destination server via the intermediate server (104) via the plurality of data channels (106) simultaneously, and assemble data received from the intermediate server (104) via the plurality of data channels (106).

10 Claims, 3 Drawing Sheets

(51) Int. Cl.
*H04L 12/709* (2013.01)
*H04W 28/02* (2009.01)
*H04W 28/20* (2009.01)

(56) References Cited

U.S. PATENT DOCUMENTS

| | | | | |
|---|---|---|---|---|
| 2011/0202641 | A1* | 8/2011 | Kahn | H04W 36/0044 709/221 |
| 2011/0222404 | A1* | 9/2011 | Watson | H04L 47/14 370/235 |
| 2012/0052814 | A1* | 3/2012 | Gerber | H04W 76/38 455/67.11 |
| 2012/0219085 | A1* | 8/2012 | Long | H04L 25/14 375/295 |
| 2013/0051261 | A1* | 2/2013 | Kazmi | H04B 7/0693 370/252 |
| 2013/0121203 | A1* | 5/2013 | Jung | H04W 52/30 370/252 |
| 2014/0044009 | A1* | 2/2014 | Piesinger | H04W 56/001 370/254 |
| 2014/0200046 | A1* | 7/2014 | Sikri | H04W 52/38 455/552.1 |
| 2016/0173939 | A1* | 6/2016 | Iwami | H04N 21/431 725/139 |
| 2016/0308907 | A1* | 10/2016 | Le | H04L 12/4641 |

* cited by examiner

SYSTEM FOR INCREASING BANDWIDTH AVAILABLE FOR DATA COMMUNICATION

BACKGROUND

Field

The subject matter in general relates to communication, and more particularly, but not exclusively, the subject matter relates to enhancing speed of data communication.

Discussion of Related Art

Usage of internet on handheld communication devices such as smart phone and tablets has been on the rise. Users tend to access a wide variety of digital content via the internet using their smart phones. Accessing rich content, such as video, audio and large files, typically require high bandwidth availability for a hassle free experience. However, it has been observed that the user experience while accessing such rich content is far from satisfactory. The reason for such unsatisfactory experience can be attributed to the insufficient bandwidth made available by the data channel made available to their device. It has been observed that, even though a device has multiple data channels, such as in the case of dual SIM dual active smart phones, only one data channel can be used at an instance for communicating data.

In light of the foregoing discussion, there is a need for a system that improves the bandwidth available to a user device. Further, a system is desired that can selectively improve bandwidth made available to a user device.

SUMMARY

An embodiment provides a system for increasing bandwidth available for data communication. The system includes a user equipment and an intermediate server. The user equipment is configured to allocate data to a plurality of data channels for transmission to the intermediate server, wherein each of the data channels is associated with a radio access technology; send the allocated data via the plurality of data channels simultaneously to the intermediate server, which will send the data to the destination server; receive data from the destination server via the intermediate server via the plurality of data channels simultaneously; and assemble data received from the intermediate server via the plurality of data channels.

Another embodiment provides a method for increasing bandwidth available for data communication. The method includes allocating data to a plurality of data channels for transmission to an intermediate server, wherein each of the data channels is associated with a radio access technology; sending the allocated data via the plurality of data channels simultaneously to the intermediate server, which will send the data to a destination server; receiving data from destination server via the intermediate server via the plurality of data channels simultaneously; and assembling data received from the intermediate server via the plurality of data channels.

BRIEF DESCRIPTION OF DRAWINGS

Embodiments are illustrated by way of example and not limitation in the Figures of the accompanying drawings, in which like references indicate similar elements and in which.

DETAILED DESCRIPTION

An embodiment provides a system for use in a dual SIM dual active smart phone. The system enables simultaneous usage of data channels made available by radio access technologies associated with the SIMs. The smart phone uploads data to or downloads data from a destination server via an intermediate server. In case of upload, the data from the smart phone is segregated and transmitted via both or available data channels to the intermediate server. The intermediate server assembles the received data and then transfers the assembled data to the destination server. In case of download, a request from the smart phone is sent to the destination server via the intermediate server to download data. The intermediate server receives data from the destination server, segregates data and transfers the data to the smart phone via both or available data channels.

The following detailed description includes references to the accompanying drawings, which form part of the detailed description. The drawings show illustrations in accordance with example embodiments. These example embodiments are described in enough detail to enable those skilled in the art to practice the present subject matter. However, it will be apparent to one of ordinary skill in the art that the present invention may be practiced without these specific details. In other instances, well-known methods, procedures and components have not been described in detail so as not to unnecessarily obscure aspects of the embodiments. The embodiments can be combined, other embodiments can be utilized or structural and logical changes can be made without departing from the scope of the invention. The following detailed description may, therefore, not to be taken as a limiting sense.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1:
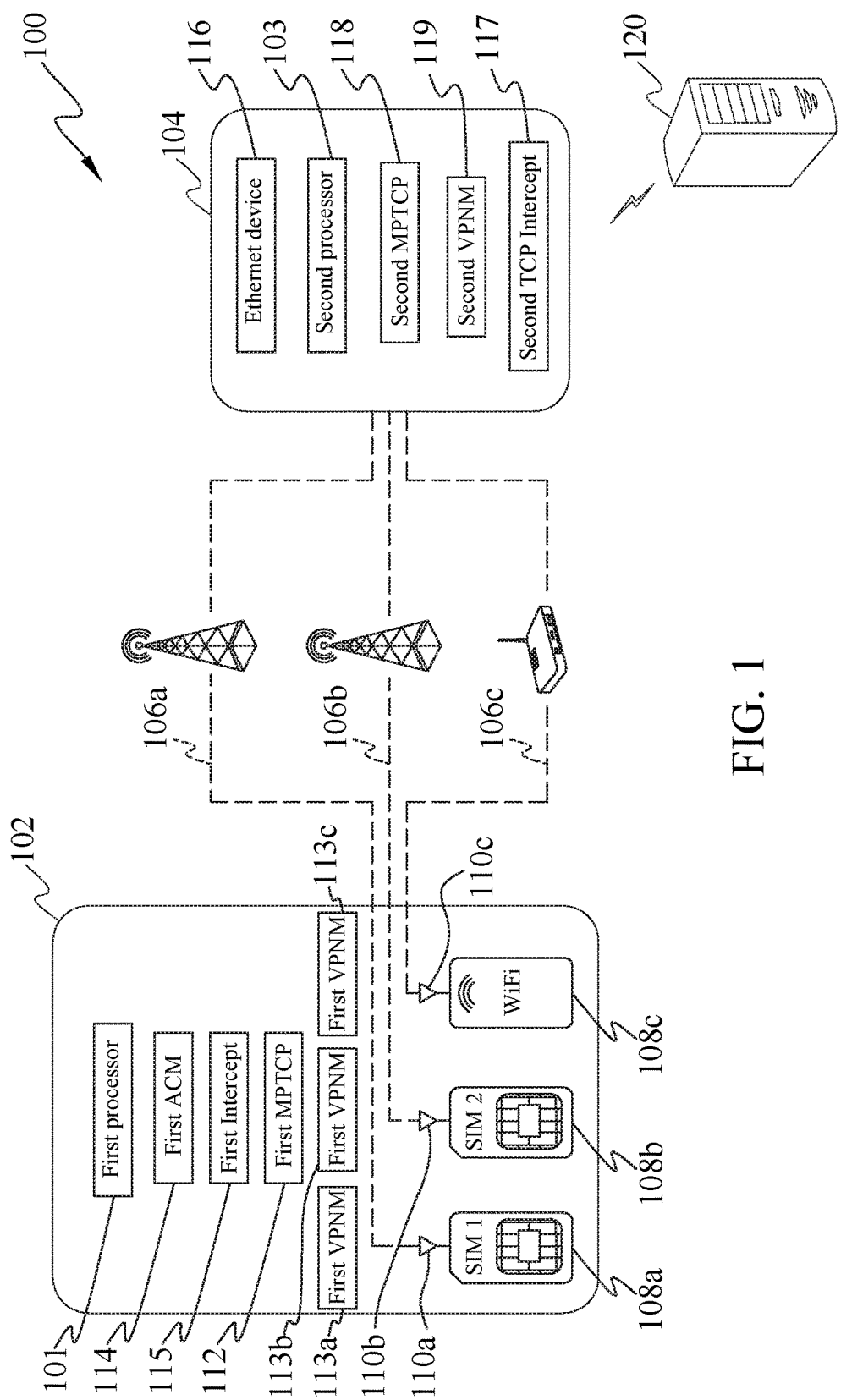
FIG. 1 is a block diagram of a system 100 for increasing bandwidth available to a user equipment 102, in accordance with an embodiment.

Referring to the figures, and more particularly to FIG. 1, a system 100 is provided for increasing bandwidth available to a user equipment. The system 100 may include a user equipment 102 and an intermediate server 104. Examples of the user equipment 102 include a hand-held telephone, a mobile phone, a smart phone, a tablet and a phablet, among others. The user equipment 102 includes a first processor 101 and a plurality of Radio Access Technologies (RATs) 108a, 108b and 108c (may be referred to as RAT 108 or RATs 108). Each of the plurality of RATs 108a, 108b and 108c is associated with a respective transceiver 110a, 110b and 110c (may be referred to as transceiver 110 or transceivers 110). Each of the transceivers 110 is capable of providing a data channel 106a, 106b and 106c (may be referred to as data channel 106 or data channels 106) for enabling the user equipment 102 to communicate with external devices through the RATs 108. The user equipment 102 further includes a first MultiPath Transmission Control Protocol (MPTCP) 112, a first Aggregation Control Module (ACM) 114, a first intercept 115, and a plurality of first Virtual Private Network Modules (VPNM) 113a, 113b and 113c (may be referred to as first VPNMs 113 or first VPNM 113) each being associated with a respective RAT 108 interface.

The intermediate server 104 includes a second processor 103, an ethernet device 116, a second VPNM 119, a second MultiPath Transmission Control Protocol (MPTCP) 118 and a second TCP intercept 117. The ethernet device 116 is configured to communicate data with external devices, such as the user equipment 102 and a destination server 120, among other devices.

As an example, the user equipment 102 is a dual SIM, dual active mode smart phone. The first RAT 108a can be EDGE, the second RAT 108b can be LTE, and the third RAT 108c can be a local area wireless technology (Ex: WiFi). The user equipment 102 may use all the three RATs 108 simultaneously to communicate data with the destination server 120 via the intermediate server 104.

An application, such as a video streaming application, in the user equipment 102 may request data to be downloaded from the destination server 120. The first ACM 114 causes the first processor 101 to use the first MPTCP 112 to enable downloading of data from the destination server 120. The first MPTCP 112 sends a request to the destination server 120 via the intermediate server 104 to download the data from the destination server 120. The first MPTCP 112 may use a default RAT, such as a first RAT 108a to send the above mentioned request to the second MPTCP 118. The request, apart from including the information corresponding to the data to be downloaded, also includes information corresponding to the RATs 108 that are available for the data to be sent to the user equipment 102.

Information corresponding to the RATs 108 can include one or more of, but not limited to, address information, bandwidth information, network strength information and service provider information.

The information corresponding to the data to be downloaded can include one or more of, but not limited to, data size, data type and address.

Further, the intermediate server 104 acting on the request from the first MPTCP 112 communicates with the destination server 120 via its ethernet device 116. The intermediate server 104 begins to download the data from the destination server 120. The second TCP intercept 117 receives data via the ethernet device 116 and transfers the data to the second MPTCP 118. The second MPTCP 118 segregates the received data into data blocks for transmission via the data channels 106. The second MPTCP 118 may determine the number and/or size of the data blocks to the transmitted via each of the data channels 106 based on the information corresponding to the RATs 108 associated with the respective data channels 106. The second VPNM 119 may encapsulate, and may also encrypt data blocks and tunnel/transmit them via each of the data channels 106 via the ethernet device 116. The data blocks transmitted via each of the data channels 106 is received by its respective RAT 108. The data blocks received by the RATs 108 are stripped of encapsulation and decrypted (if encrypted previously) by the first VPNMs 113, and provided to the first MPTCP 112 for processing. The first MPTCP 112 arranges or assembles the data blocks in the logical sequence and makes the assembled data available for access by one or more applications in the user equipment 102.

The above example described downloading data by the user equipment 102 using RATs 108 simultaneously. Likewise, the user equipment 102 can use RATs 108 simultaneously to upload data to the destination server 120. An application in the user equipment 102 may request data to be uploaded to the destination server 120. The first ACM 114 causes the first processor 101 to use the first MPTCP 112 to enable uploading of data to the destination server 120. The first MPTCP 112 sends a request to the destination server 120 via the intermediate server 104 to upload the data to the destination server 120. The first MPTCP 112 may use a default RAT, such as a first RAT 108a to send the above mentioned request to the second MPTCP 118. The request, apart from including the information corresponding to the data to be uploaded, may also includes information corresponding to the RATs 108 that are available for the data to be sent from the user equipment 102.

The first MPTCP 112 segregates the data to be uploaded into data blocks and allocates the same for transmission via the data channels 106. The first MPTCP 112 may determine the number and/size of the data blocks to be transmitted via each of the data channels 106 based on the information corresponding to the RATs 108 associated with the respective data channels 106. The first VPNMs 113 may encapsulate, and may also encrypt the data blocks to be transmitted via each of the data channels 106. The data blocks transmitted via each of the data channels 106 are received by the intermediate server 104. The second VPNM 119 may strip the data blocks from encapsulation, and decrypt (if encrypted previously) and provided the data blocks to the second MPTCP 118 for processing. The second MPTCP 118 processes the received data, and arranges the packets of data in a logical sequence and transfers the data to the second TCP intercept 117. The second TCP intercept 117 may modify the data blocks, which may be in the form of multipath transmission control protocol sockets to transmission control protocol sockets. Subsequently, the intermediate server 104 transmits the data to the destination server 120 for uploading using its ethernet device 116.

Figure 2:
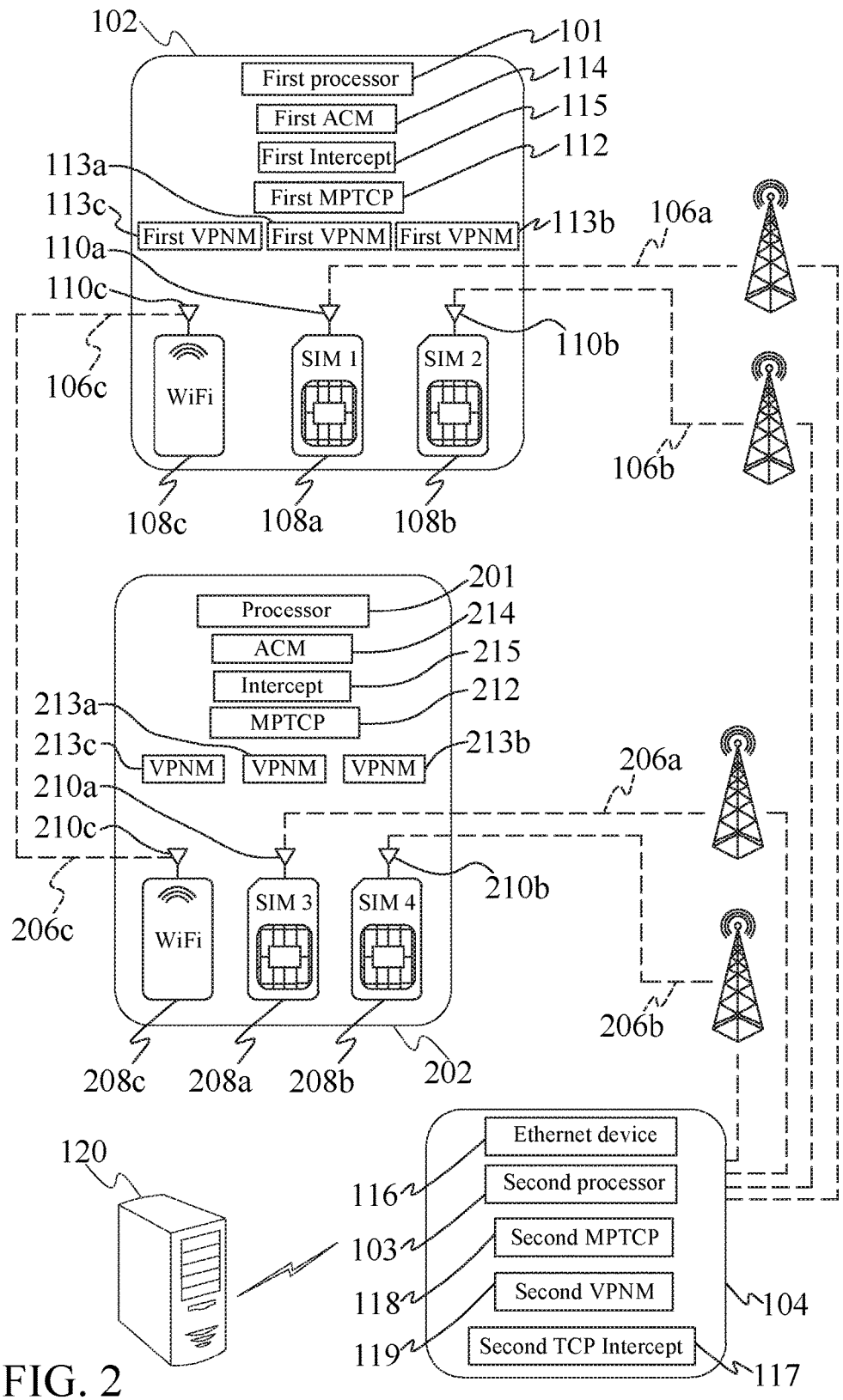
FIG. 2 is a block diagram of an exemplary embodiment illustrating a first user equipment 102 using bandwidth made available by one or more RATs 108 provided within it and one or more RAT(s) made available by at least one external user equipment 202.

Referring to FIG. 2, another exemplary embodiment is described. In this embodiment, the first user equipment 102 uses bandwidth made available by one or more RATs 108 provided within it and one or more RAT(s) made available by at least one external user equipment 202, to communicate date with at least one destination server 120. In this example, the external user equipment 202 is similar to the user equipment 102, in the sense that, the external user equipment 202 also includes a processor 201, a plurality of Radio Access Technologies (RATs) 208a, 208b and 208c (may be referred to as RAT 208 or RATs 208), a plurality of VPNMs 213 and an intercept 215. Each of the plurality of RATs 208a, 208b and 208c is associated with a respective transceiver 210a, 210b and 210c (may be referred to as transceiver 210 or transceivers 210). Each of the transceivers 210 is capable of providing a data channel 206a, 206b, 206c (may be referred to as data channel 206 or data channels 206) for enabling the external user equipment 202 to communicate with external devices through the RATs 208. The external user equipment 202 further includes a MultiPath Transmission Control Protocol (MPTCP) 212 and an Aggregation Control Module (ACM) 214.

The first user equipment 102 may connect with the external user equipment 202. The connection may be established between the Wi-Fi RAT 108c of the first user equipment 102 and the Wi-Fi RAT 208c of the external user equipment 202, thereby making the channels 106a, 106b, 206a and 206b of the RATs 108a, 108b, 208a and 208b available for communication with the intermediate server 104. The first ACM 114 sends a message via channel 206c which is understood by ACM 214, which in turn enables its intercept 215. Further, the first VPNM 113c and VPNM 213c may be disabled.

An application in the first user equipment 102 may request data to be downloaded from the destination server 120 via the intermediate server 104. The first ACM 114 causes the first processor 101 to use the first MPTCP 112 to enable downloading of data from the destination server 120. The first ACM 114 may also causes the first MPTCP 112 to consider data channel made available by the external user equipment 202, via the connection 206c between the RATs 108c and 208c. The first MPTCP 112 sends a request to the destination server 120 via the intermediate server 104 to download the data from the destination server 120. The first MPTCP 112 may use a default RAT, such as a first RAT 108a to send the above mentioned request to the second MPTCP 118. The external user equipment 202 may establish communication via data channels 206a and 206b with the intermediate server 104. In an embodiment, the intercept 215 of the external user equipment 202 intercepts a request to establish communication with the intermediate server 104. Thereafter, the intercept 215 originates a request at the external user equipment 202 to establish communication with the intermediate server 104. The MPTCP 212 thereafter establishes communication with the intermediate server 104 using data channels 206a and 206b.

The intermediate server 104 acting on the request from the first MPTCP 112 communicates with the destination server 120 via its ethernet device 116. The request from the first MPTCP 112 may be intercepted by the second TCP intercept 117. The intermediate server 104 begins to download the data from the destination server 120. The second TCP intercept 117 receives the data and modifies the data, which may be in the form of transmission control protocol sockets to multipath transmission control protocol sockets. The second MPTCP 118 segregates the received data into data blocks for transmission via the data channels 106a, 106b, 206a and 206b. The second MPTCP 118 may determine the number and/or size of the data blocks to the transmitted via each of the data channels 106 and 206 based on the information corresponding to the RATs 108a, 108b, 208a and 208b associated with the respective data channels 106a, 106b, 206a and 206b. The second VPNM 119 may encapsulate, and may also encrypt the data to be transmitted. The data blocks transmitted via each of the data channels 106a, 106b, 206a and 206b is received by its respective RAT 108a, 108b, 208a and 208b. The data blocks received by the RATs 208a and 208b are transmitted to the first user equipment 102 via the data channel 206c. The data blocks received by the RATs 208a and 208b may be processed by the MPTCP 212 of the external user equipment 202 before transferring it to the first user equipment 102. The first MPTCP 112 processes the data received by the RATs 108a, 108b and 108c, to arrange the data received in a logical sequence. The arranged data is made available to other applications in the first user equipment 102.

It may be noted that in case of upload, the first MPTCP 112 may allocate data blocks to the WiFi RAT 108c based on the bandwidth made available by the RAT 108c. The MPTCP 212 of the external user equipment 202 may segregate data received by the WiFi RAT 208c from the WiFi RAT 108c, for transmission by the RAT 206a and 206b. The intercept 215 of the external user equipment 202 may intercept the data received by WiFi RAT 208c, and thereafter may originate the data at the external user equipment 202 to be transmitted through the MPTCP 212, which segregates and transmits via data channels 206a and 206b. Such interception ensures that both the data channels 206a and 206b are used for transmitting data.

In light of this description, it should be noted that each of the user equipments can have one or more RATs. Further, even if the user equipments have multiple RATs, all of the available RATs may not be used for data communication simultaneously.

It may be noted that embodiments allow combining bandwidths/data channels made available by a single user equipment, and combining bandwidths/data channels made available by a multiple user equipments. One or more user equipments can be a single SIM device or a multiple SIM device with one or more active SIMs.

Examples of RATs include, but are not limited to, GSM (Global System for Mobile Communications), CDMA (Code division multiple access), WiMAX (Worldwide Interoperability for Microwave Access), LTE (Long-Term Evolution, commonly marketed as 4G LTE), Wi-Fi, Bluetooth and TD-SCDMA (Time Division Synchronous Code Division Multiple Access), among other wireless technology used to provide air interface to mobile devices for availing various data communication services.

Figure 3:
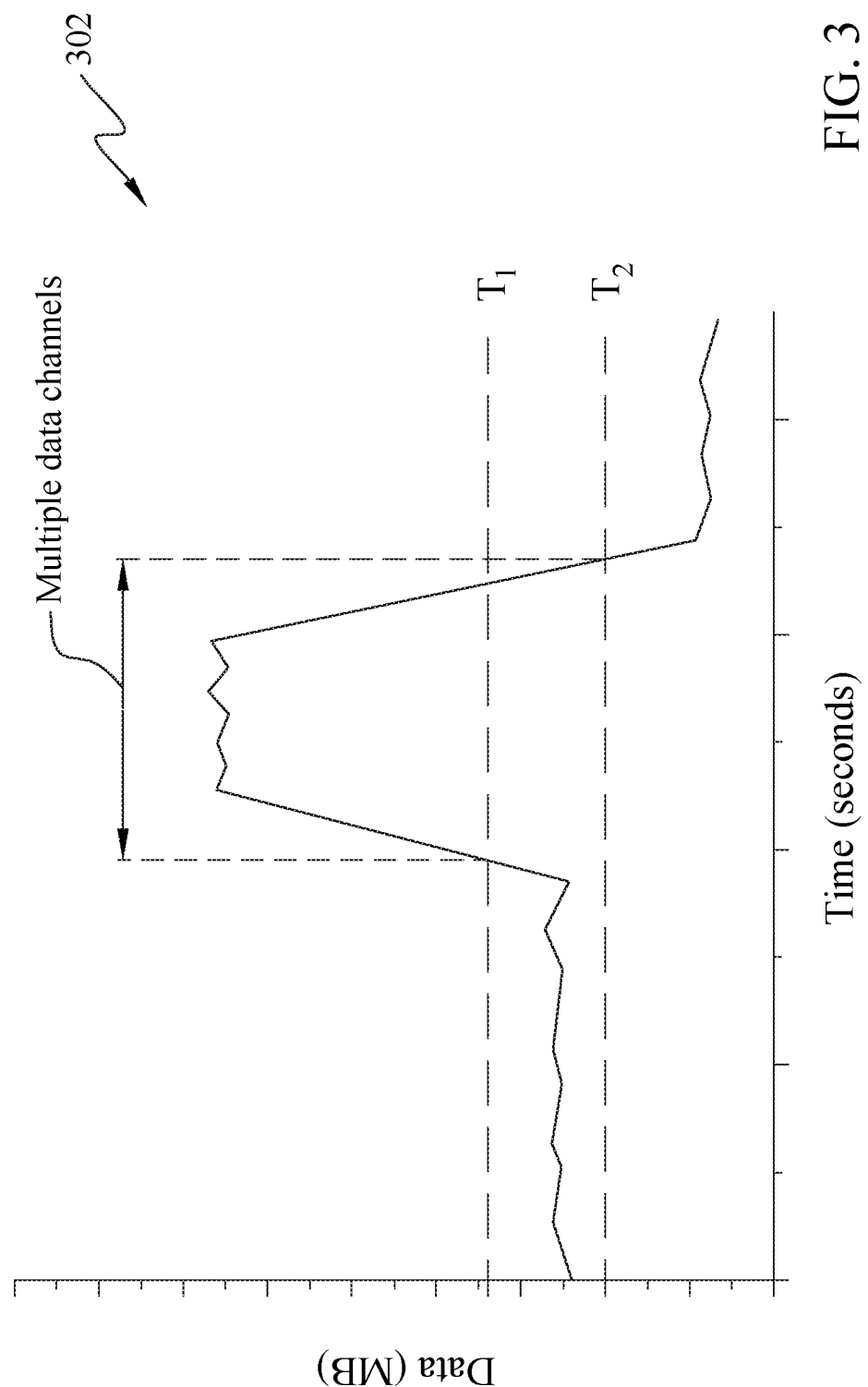
FIG. 3 illustrates monitoring of data usage by the user equipment 102, in accordance with an embodiment.

In an embodiment, the first ACM 114 is configured to selectively enable simultaneous usage of multiple data channels 106 to enable communication with the destination server 120 via the intermediate server 104. Referring to FIG. 3, the first ACM 114 monitors the data usage 302 in real time by the user equipment 102. The first ACM 114 has a first threshold data usage value "T1", which is pre-configured or configurable. Once the real time data usage 302 crosses the first threshold data usage value "T1", the first ACM 114 causes the first processor 101 to use the first MPTCP 112 for data communication, which in turn enables usage of multiple data channels 106 to enable communication with the destination server 120 via the intermediate server 104. Further, the first ACM 114 causes the first processor 101 to terminate using the first MPTCP 112 for data communication once the real time data usage 302 falls below a second threshold data usage value "T2".

In an embodiment, the first and the second threshold data usage values may be same. Alternatively, the first and the second threshold data usage values may be different.

In an embodiment, one or more of the threshold data usage value is a function of data and time. For example, the second threshold data usage value may be 10 mbps for a period of 6 seconds. In this example, usage of multiple data channels simultaneously is terminated when the real time data usage falls below 10 mbps and continues to remain below 10 mbps for a period of at least 6 seconds.

In an embodiment, the first ACM 114 is configured to selectively enable simultaneous usage of multiple data channels 106 to enable communication with the destination server 120 via the intermediate server 104. The first ACM 114 may have enlisted one or more applications from a plurality of applications executed on the first processor 101 for simultaneous usage of multiple data channels 106 to enable communication with the destination server(s) 120 via the intermediate server 104. The applications that are generally enlisted in the first ACM 114 may be those which may need a higher data transfer/receive rate or a large amount of data usage. When one or more of the enlisted applications request to communicate with external device(s), the first ACM 114 causes the first processor 101 to use the first MPTCP 112 for data communication, which in turn enables usage of multiple data channels 106 to enable communication with the destination server 120 via the intermediate server 104. The enlisting of the application in the first ACM 114 is pre-configured or configurable, for example by a user of the user equipment 102.

In an embodiment, the first ACM 114 is configured to selectively enable simultaneous usage of multiple data channels 106 to enable communication with the destination server 120 via the intermediate server 104 based on the type of content or size of the content. Simultaneous usage of multiple data channels 106 is enabled when the size of the content/data to be communicated is beyond a preconfigured or configurable threshold value.

In an embodiment, the first ACM 114 is configured to selectively enable simultaneous usage of multiple data channels 106 to enable communication with the destination server 120 via the intermediate server 104 based on the battery status of the user equipment 102. Simultaneous usage of multiple data channels 106 is terminated if the charge in the battery is below a threshold. In an embodiment, the number of data channels 106 used simultaneously for communication may be increased or decreased based on the charge in the battery.

In an embodiment, simultaneous usage of multiple data channels 106 is enabled based on the type of content being/to be communicated. The type of content is identified, for example, based on the file extension. In an embodiment, the first ACM 114 identifies the type of content in coordination with a media manager module of the user equipment 102. For example, when a video or audio content is being streamed and played on the user equipment 102 by the media manager module, the first ACM 114 identifies that a video/audio content is being downloaded, and causes the first processor 101 to use the first MPTCP 112 for data communication, which in turn enables usage of multiple data channels 106 to enable communication with the destination server 120 via the intermediate server 104.

It shall be noted that the processes described above is described as sequence of steps, this was done solely for the sake of illustration. Accordingly, it is contemplated that some steps may be added, some steps may be omitted, the order of the steps may be re-arranged, or some steps may be performed simultaneously.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention. Thus the scope of the invention should be determined by the appended claims and their legal equivalents rather than by the examples given.

We claim:

1. A system for increasing bandwidth available for data communication,
the system comprising a user equipment and an intermediate server, wherein,
the user equipment is configured to:
allocate data to a plurality of data channels for transmission to the intermediate server,
wherein each of the data channels is associated with a radio access technology, wherein the user equipment is configured to selectively enable communication of data via the plurality of data channels simultaneously:
if data usage by the user equipment crosses a first threshold;
if data communication with an external device is requested by one or more enlisted applications; or
based on type of content being communicated;
send the allocated data via the plurality of data channels simultaneously to the intermediate server;
receive data from the intermediate server via the plurality of data channels simultaneously; and
assemble data received from the intermediate server via the plurality of data channels.

2. The system according to claim 1, wherein the user equipment is further configured to send a request for data communication to a destination server via the intermediate server, wherein the request is sent via one of the plurality of data channels, wherein the request includes information corresponding to the radio access technologies associated with the data channels.

3. The system according to claim 1, wherein each of the radio access technologies is associated with a transceiver, wherein the transceiver of at least one of the radio access technologies is in an external user equipment.

4. The system according to claim 3, wherein the user equipment is further configured to communicate data with the external user equipment via a data channel that is discrete from the data channels used for communication with the intermediate server.

5. The system according to claim 1, wherein the user equipment is configured to
terminate communication of data via the plurality of data channels simultaneously when data usage by the user equipment falls below a second threshold, when simultaneous communication of data via the plurality of data channels is enabled if data usage by the user equipment crosses the first threshold.

6. The system according to claim 1, wherein the type of content is determined based on file extension.

7. The system according to claim 1, wherein the type of content is determined in coordination with a media manager module present in the user equipment.

8. The system according to claim 1, wherein the intermediate server is configured to receive data from the plurality of data channels and send the received data to a destination server.

9. The system according to claim 1, wherein the intermediate server is configured to:
receive data from a destination server;
allocate the data received from the destination server to the plurality of data channels for transmission to the user equipment; and
send the allocated data via the plurality of data channels simultaneously to the user equipment.

10. A method for increasing bandwidth available for data communication, the method comprising:
selectively enabling communication of data via a plurality of data channels simultaneously:
if data usage by a user equipment crosses a first threshold;
if data communication with an external device is requested by one or more enlisted applications; or
based on type of content being communicated;

allocating data to the plurality of data channels for transmission to an intermediate server, wherein each of the data channels is associated with a radio access technology;
sending the allocated data via the plurality of data channels simultaneously to the intermediate server;
receiving data from the intermediate server via the plurality of data channels simultaneously; and
assembling data received from the intermediate server via the plurality of data channels.

* * * * *